2 Sheets—Sheet 1
G. H. PERKINS
Combined Clamp and Soldering Apparatus.
No. 206,193. Patented July 23, 1878.
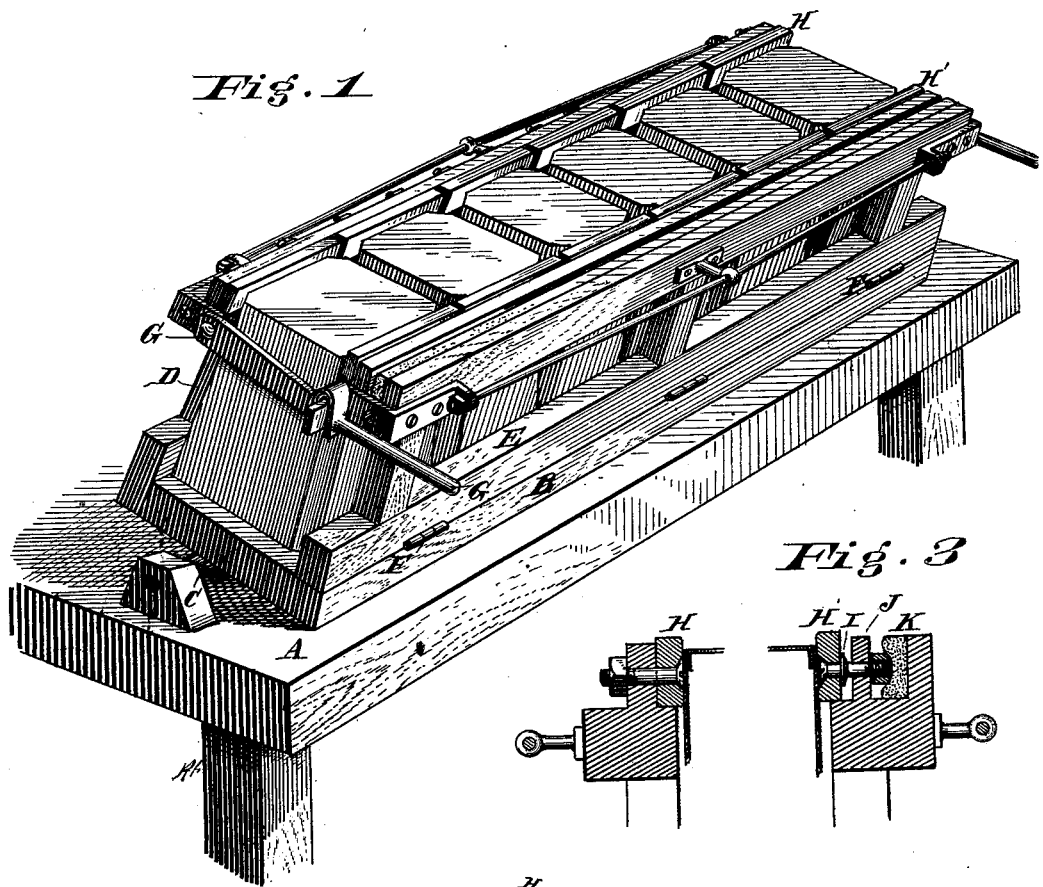
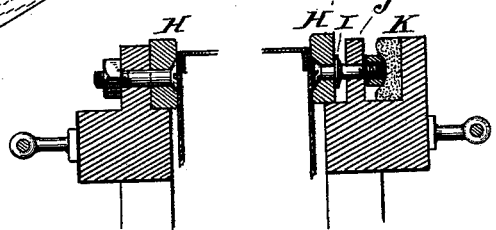
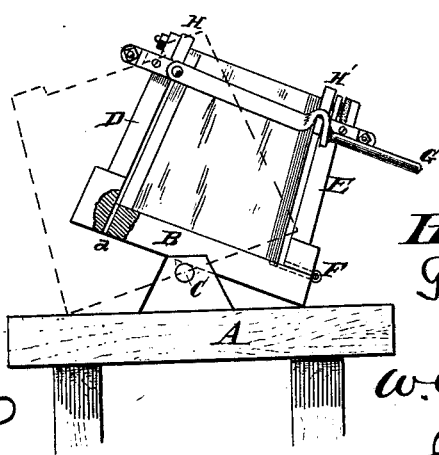
Attests
Inventor
George H. Perkins
By his Attorneys,
W. C. Strawbridge
J. Bonsall Taylor.

2 Sheets—Sheet 2

G. H. PERKINS
Combined Clamp and Soldering Apparatus.

No. 206,193. Patented July 23, 1878.

Attest

Inventor
George H. Perkins—
By his Attorneys
Wm C Strawbridge
Bonsall Taylor.

UNITED STATES PATENT OFFICE.

GEORGE H. PERKINS, OF PHILADELPHIA, PENNSYLVANIA.

IMPROVEMENT IN A COMBINED CLAMP AND SOLDERING APPARATUS.

Specification forming part of Letters Patent No. 206,193, dated July 23, 1878; application filed June 7, 1878.

*To all whom it may concern:*

Be it known that I, GEORGE H. PERKINS, of the city and county of Philadelphia, in the State of Pennsylvania, have invented a new and useful Improvement in Combined Clamp and Soldering Apparatus for Metal Cans, of which the following is a full, clear, and exact description.

My invention relates to the class of devices which are employed in soldering the heads or tops and bottoms upon metal cans, and is more especially designed for use with square, rectangular, and truncated-cone cans, but is applicable by adaptation to cans of other shapes.

It consists in the apparatus hereinafter described and claimed, which, when applied to the cans to be soldered, embraces the three functions of clamp for the can-bodies against the heads, guide for the soldering iron and mold for the solder.

Figure 4:
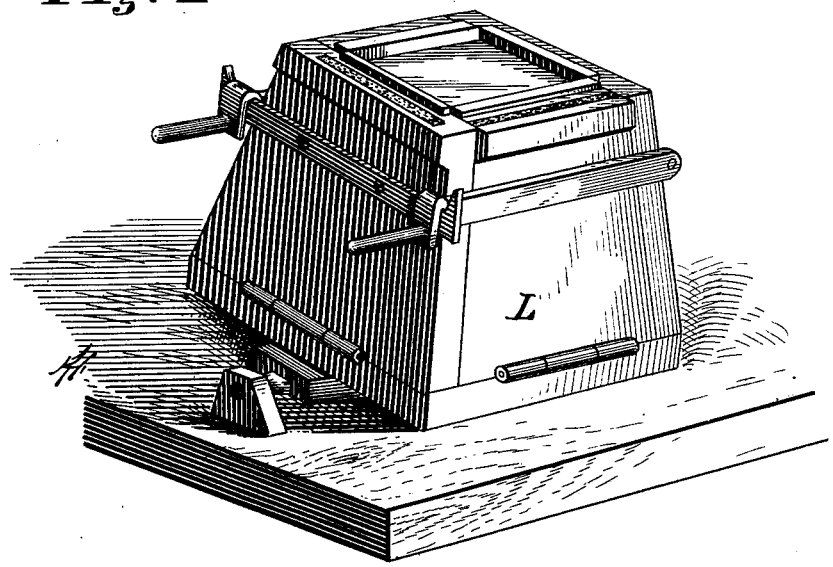

Of the drawings, in all of which similar letters of reference indicate corresponding parts, Figure 1 is a representation, in perspective, of an apparatus embodying my invention adapted for use in the soldering of a series of cans; Fig. 2, an end view of the same; Fig. 3, a transverse sectional detail of the clamping-faces and elastic cushion; Fig. 4, a view, in perspective, of an apparatus for use with a single can; and Fig. 5, a longitudinal elevation, partially in section, of the swivel arrangement applied to the same.

The entire apparatus is conveniently mounted upon a table or frame-work, A, of any suitable kind.

B is the base, of any requisite length, according to the number of cans desired to be soldered at the same time. The base is hung upon a longitudinal pivot, C, in such manner that it can be rocked or tilted over from side to side about the pivot as a longitudinal axis.

D E are the clamp sides, being each a framework of the length of the base, and one or both hinged lengthwise to the latter, as at F. They may be set so as to incline inward, as represented in the drawing, to adapt them for use with conically-truncated cans, or they may be set perpendicularly for use with a square can. They are made of height greater than the height of the can, and are faced with slate or glass, as hereinafter described, at their top portion, so that when the whole device is inclined they form, in connection with the tops of the cans, a V-shaped groove, in which the solder can run, the projecting upper portion of the side forming a guide against which the soldering-iron can be drawn.

In upright position these sides are connected together at their ends by locking devices G. Along their inside top portion they are provided with a series of faces, H H', of slate or other material to which solder will not adhere, each face of about the length of an end of a can, those, H, upon one clamp side being rigidly secured thereto, while those, H', upon the other are adjustably connected by means of swiveled set-screws I passing through an upright ledge, J, on the clamp side, the inner ends of the set-screws being provided with adjusting-nuts, and abutting against rubber cushions K, springs, or the like, so as to give a compressible bearing to the faces.

Such being the construction of my apparatus, it is operated as follows: The clamp sides being unlocked and thrown apart, the requisite number of can-bodies are set in place upon the base, and the ends placed in position on or in the bodies. The clamp sides are then closed up and compressed by means of the lock G against the cans, so as to retain them and their heads rigidly in position and prevent any warping, the elastic adjustment of the slate faces permitting accommodation to varying sizes of head. The locked and filled apparatus is then, by means of its base, rocked to one side, the cans and their tops being consequently inclined to such side. The soldering-iron is then applied to the sides of the head, which are inclined down, being run against the slate faces. The apparatus is then tilted to the other side, and the soldering-iron applied in similar manner upon the other side. Two sides of each can being thus soldered, the locks are thrown off and each can turned half around upon the base, and the action repeated as to the sides remaining unsoldered.

It is obvious that, while the side clamps hold both the bodies and tops in place with regard to each other and prevent any warping, the projection of the clamp sides and their slate faces form a guide against which the soldering-iron is run, and, in connection with the inclination given to the machine by the tilting of the base, form a V-shaped groove or mold, in and by means of which the solder may be more easily soaked into the seams, while, by the same arrangement of parts and the tightness of the clamping devices, the solder is prevented from running down at the side of the can.

*a* represents a drip-aperture, to relieve the base from any possible accumulation of solder or flux.

In Fig. 4 the invention is represented in such modified manner as to be applicable to a single can, ends L being added to the sides, and similarly provided with slate surfaces.

Figure 5:
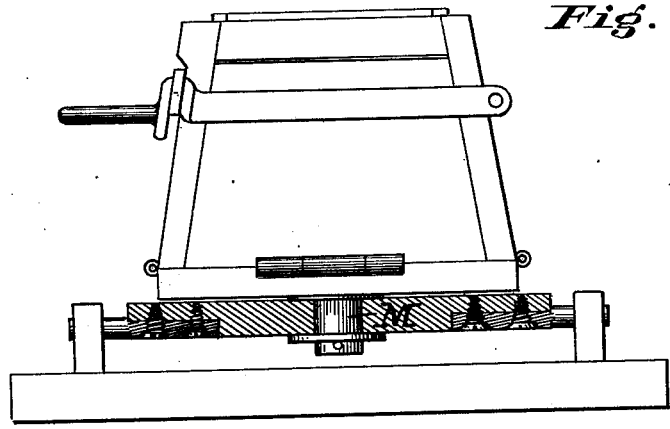

In Fig. 5 the base of the above apparatus is represented as swiveled at M to the tilting pivot, to permit the turning of the clamping device itself half around and obviate that of the can.

Having thus described my invention, I claim and desire to secure by Letters Patent of the United States—

1. A combined clamp and soldering apparatus for metal cans, consisting of a base upon which one or more cans are set, and clamp sides projecting above the tops of the cans and adapted to be locked against them, substantially as described.

2. A combined clamp and soldering apparatus for metal cans, consisting, essentially, of a base upon which one or more cans are set, and clamp sides hinged to the base, projecting above the tops of the cans, so as to form, in connection therewith, a V-shaped groove, and adapted to be locked against the cans, so as to retain them in position, the whole arranged to tilt from side to side, substantially as and for the purposes set forth.

3. In combination with the clamp sides D E, clamping-faces H H', formed of slate or its equivalent, for the purpose set forth.

4. In combination with the clamp sides D E, hinged below to the base and united together above by a rigid lock, an adjustable clamp-face, H', attached to one of the sides, for the purpose specified.

In testimony whereof I have hereunto set my hand this 28th day of May, 1878.

GEORGE H. PERKINS.

In presence of—
   J. BONSALL TAYLOR,
   WM. C. STRAWBRIDGE.